(12) United States Patent
Fukuchi

(10) Patent No.: US 8,477,074 B2
(45) Date of Patent: Jul. 2, 2013

(54) CARD-TYPE DEVICE

(75) Inventor: Hiroaki Fukuchi, Kyoto (JP)

(73) Assignees: Murata Manufacturing Co., Ltd. (JP); SII Mobile Communications Inc. (JP)

( * ) Notice: Subject to any disclaimer, the term of this patent is extended or adjusted under 35 U.S.C. 154(b) by 293 days.

(21) Appl. No.: 13/086,222

(22) Filed: Apr. 13, 2011

(65) Prior Publication Data

US 2011/0187612 A1    Aug. 4, 2011

Related U.S. Application Data

(63) Continuation of application No. PCT/JP2009/067785, filed on Oct. 14, 2009.

(30) Foreign Application Priority Data

Oct. 14, 2008   (JP) .................................. 2008-265367

(51) Int. Cl.
  *H01Q 1/24* (2006.01)
(52) U.S. Cl.
  USPC ............................ 343/702; 343/757; 343/872
(58) Field of Classification Search
  USPC ......................................... 343/702, 757, 872
  See application file for complete search history.

(56) References Cited

U.S. PATENT DOCUMENTS

| | | | |
|---|---|---|---|
| 6,686,887 B2 | 2/2004 | Kasuya et al. | |
| 7,509,143 B2 * | 3/2009 | Lintern et al. | 455/558 |
| 2002/0163472 A1 * | 11/2002 | Kasuya et al. | 343/702 |
| 2003/0128167 A1 * | 7/2003 | Beard et al. | 343/702 |
| 2005/0048949 A1 * | 3/2005 | Uchida et al. | 455/407 |
| 2005/0197169 A1 * | 9/2005 | Son | 455/572 |
| 2010/0051698 A1 * | 3/2010 | Zhao et al. | 235/486 |

FOREIGN PATENT DOCUMENTS

| | | |
|---|---|---|
| JP | 05-053980 | 3/1993 |
| JP | 08-279027 | 10/1996 |
| JP | 2001-332914 A | 11/2001 |
| JP | 2002-026620 A | 1/2002 |
| JP | 2002-185353 A | 6/2002 |
| JP | 2005-167847 A | 6/2005 |
| JP | 3689382 | 6/2005 |
| WO | 2006/025406 A1 | 3/2006 |

OTHER PUBLICATIONS

International Search Report; PCT/JP2009/067785; Jan. 12, 2010.
Written Opinion of the International Searching Authority; PCT/JP2009/067785; Jan. 12, 2010.

* cited by examiner

*Primary Examiner* — Allyson Trail
(74) *Attorney, Agent, or Firm* — Studebaker & Brackett PC

(57) ABSTRACT

A slide antenna board is slidably provided between a state in which slide antenna board is accommodated in a card body and a state in which slide antenna board is pulled out from the card body. The slide antenna board includes a planar type antenna. A base end side of a rod antenna is fixed to the card body and an extended side of the rod antenna is slidably and stretchably disposed in a slide direction of the slide antenna board through a slide guide in the slide antenna board. A leading end surface of rod antenna is not projected ahead of a leading end surface of slide antenna board in a state in which rod antenna is accommodated. An engagement unit engaging the slide antenna board is provided with the leading end side of rod antenna. The rod antenna engaging slide antenna board is configured to be pulled out together with slide antenna board while slide antenna board is pulled out from card body.

4 Claims, 4 Drawing Sheets

CARD-TYPE DEVICE

CROSS REFERENCE TO RELATED APPLICATIONS

The present application is a continuation of International Application No. PCT/JP2009/067785, filed Oct. 14, 2009, which claims priority to Japanese Patent Application No. 2008-265367 filed Oct. 14, 2008, the entire contents of each of these applications being incorporated herein by reference in their entirety.

FIELD OF THE INVENTION

The invention relates to a card-type device, such as a PC card and a CF™ (Compact Flash) card, which has a wireless communication function.

BACKGROUND

As illustrated in FIG. 4, a PC card is used while inserted and loaded into a card slot 10 on a personal computer 41. In wireless communication card terminals (card-type device) such as the PC card, there is proposed a card-type device in which a wireless communication antenna can be accommodated in and pulled out from a card body. For example, see Japanese Patent Laying-Open No. 2001-332914 (Patent Document 1) and Japanese Patent Laying-Open No. 8-279027 (Patent Document 2).

FIGS. 5a and 5b illustrate an example of the PC card described in Patent Document 1. In a PC card 30, an antenna unit 22 equipped with a wireless communication antenna is provided so as to be slidable with respect to a card body 21. FIG. 5a illustrates a state in which antenna unit 22 is pulled out from card body 21. FIG. 5b illustrates a state in which antenna unit 22 is accommodated in card body 21.

In PC card 30 of the proposed example, as illustrated in FIG. 5b, when PC card 30 is inserted and loaded in the card slot 10 of personal computer 41, antenna unit 22 is not projected outward while accommodated in card body 21. Therefore, in PC card 30, a shock from the outside is avoided to improve shatter resistance, and portability and operability are also improved.

SUMMARY

In one aspect of the disclosure, a card-type device includes a card body and a slide antenna board. The slide antenna board is slidably provided in the card body and slidably movable in a slide direction between a state in which slide antenna board is accommodated in the card body and a state in which the slide antenna board is pulled out from the card body. The antenna board includes at least one planar type antenna A base end side of a rod antenna is fixed to the card body and an extended side of the rod antenna from the base end side is slidably and stretchably disposed in the slide direction of the slide antenna board through a slide guide provided in the slide antenna board. An engagement unit is configured to engage with the slide antenna board is provided on a leading end side of the rod antenna such that the rod antenna is pulled out together with the slide antenna board when the slide antenna board is pulled out from the card body. In the state in which the rod antenna is accommodated, an antenna leading end surface of the rod antenna is provided in a retreat position in which the antenna leading end surface is not projected ahead of a leading end surface of the slide antenna board. The card body is configured to be insertable in a card insertion unit while the slide antenna board is accommodated in the card body, thereby the slide antenna board and the rod antenna are insertable in the card insertion unit while not projected outward from the card insertion unit. The leading end side of the rod antenna is configured to be pulled out from the card insertion unit together with the slide antenna board while the slide antenna board is pulled out from the card body.

In one aspect of a more specific embodiment, a projection projected ahead may be provided on a pull-out leading end side of the slide antenna board. The projection may be projected from the card insertion unit when the card body is inserted in the card insertion unit while the slide antenna board is accommodated in the card body.

In another aspect of a more specific embodiment, a follow-up engagement assembly may be provided on the leading end side of the rod antenna. The follow-up engagement assembly can be configured to cause the rod antenna to follow up the slide antenna board to slidably contract the rod antenna and accommodates the rod antenna in the card body, when the slide antenna board is inserted and contracted. The slide antenna board may be accommodated while the leading end surface of the pulled-out rod antenna is retreated to a retreat position in which the leading end surface of the pulled-out rod antenna is not projected ahead of the leading end surface of the slide antenna board. At this point, the slide antenna board pulled out from the card body can be slidably moved on a side opposite a pull-out direction of the slide antenna board to insert and accommodated in the card body.

Other features, elements, and characteristics consistent with this disclosure will become more apparent from the following detailed description of exemplary embodiments with reference to the attached drawings.

BRIEF DESCRIPTION OF THE DRAWINGS

FIG. 1c is a view illustrating a fitting configuration between a head fitting unit and an antenna head of a rod antenna in the card-type device of FIG. 1a.

DETAILED DESCRIPTION

Recently, there is a demand for a complex card-type device including plural types of antennae. However, the proposed PC card 30 shown in FIGS. 5a and 5b does not meet the demand because it has only one type of the antenna.

Figure 5A:
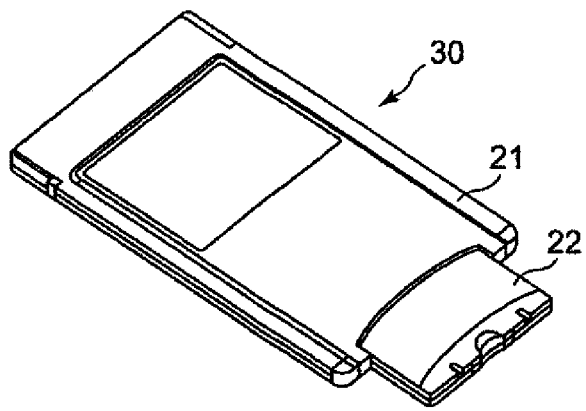
FIG. 5a is a view illustrating a conventional card-type device having an antenna unit in a position extending from the body of the card-type device.
Figure 5B:
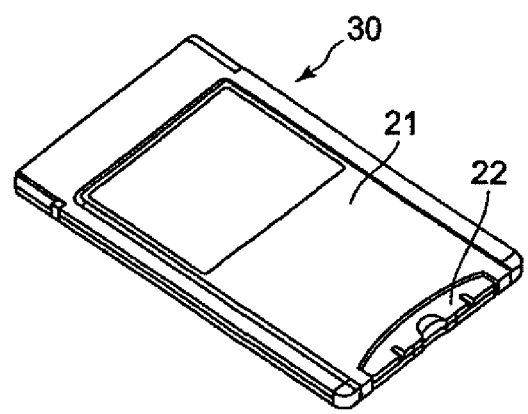
FIG. 5b is a view illustrating the example of the conventional card-type device of FIG. 5a in which the antenna unit is accommodated in the body of the card-type device.

The inventors have realized that to secure a good wireless communication characteristic, an antenna is projected to the outside from card slot of a personal computer, but that in the proposed PC card 30 shown in FIGS. 5a and 5b, the antenna is configured not to be projected outward when the antenna is inserted and removed from the card slot 10 of personal computer 41. It has been further realized that in PC card 30, it is difficult to pull out antenna unit 22 while the antenna is accommodated in card body 21. Therefore, usability of PC card 30 is degraded and it is difficult to secure a good wireless communication characteristic. Thus, the inventors realized improvements of usability, shatter resistance, portability and operability are not sufficiently achieved with the antenna unit 22 not capable of being pulled out before the antenna unit 22 is accommodated in the PC card 30 inserted in card slot 10.

Figure 1A:
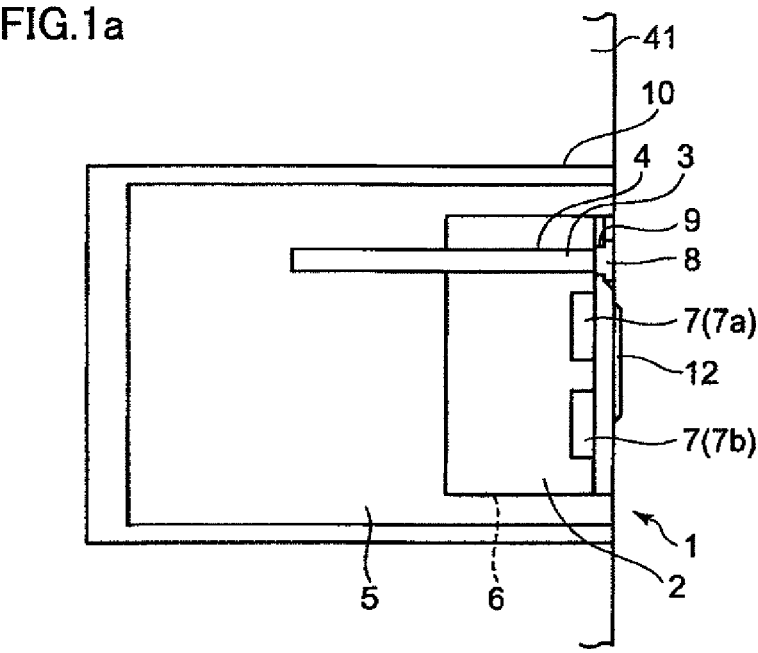
FIG. 1a is a sectional view illustrating a card-type device according to an exemplary embodiment of the invention.
Figure 1B:
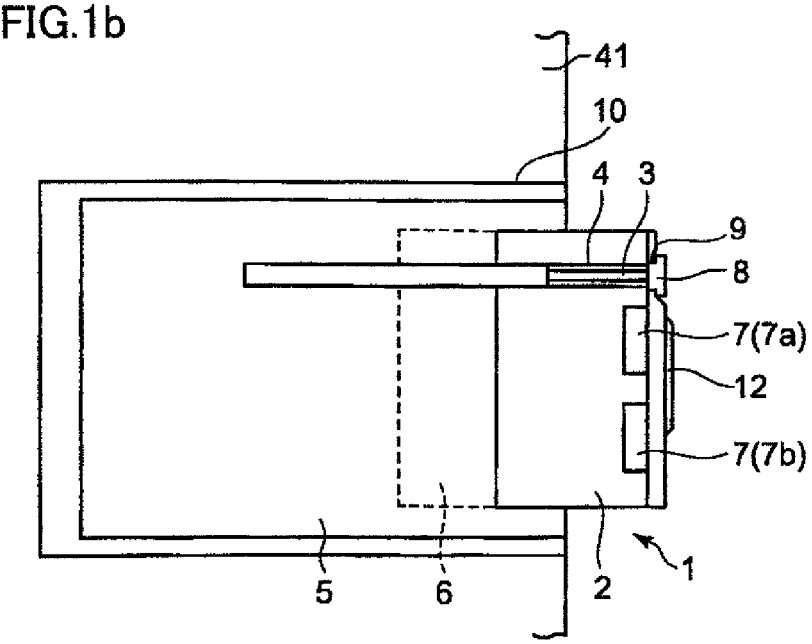
FIG. 1b is a sectional view illustrating a state in which a slide antenna board of the card-type device of FIG. 1a is pulled out.

Hereinafter, an exemplary embodiment will be described with reference to the drawings. More particularly, FIGS. 2a to 2e are appearance diagrams schematically illustrating a card-type device 1 according to the exemplary embodiment of the invention, and FIGS. 1a and 1b are sectional views schematically illustrating the card-type device 1 in a state in which the card-type device 1 is inserted and loaded in a card slot 10 of a personal computer 41, for example, a notebook personal computer. In an embodiment, card-type device 1 of the exemplary embodiment can be implemented as a PC card and a CF card, for example. As illustrated in FIGS. 1a and 1b, card-type device 1 is inserted in card slot 10 of a card insertion unit of the personal computer 41.

Card-type device 1 includes a card body 5 whose surface and rear surface are electromagnetically shielded, and a slide antenna board 2 that is slidingly engagable with the card body 5 to be accommodated on an insertion rear end side of card body 5. More specifically, slide antenna board 2 is fitted in a board accommodation unit 6 of card body 5 and slidably provided in a card insertion direction of card body 5. Slide antenna board 2 is slidable between a state in which slide antenna board 2 is accommodated in card body 5 and a state in which slide antenna board 2 is pulled out from card body 5.

Figure 2A:
FIG. 2a is an appearance diagram illustrating a side view of the card-type device according to an exemplary embodiment.
Figure 2B:
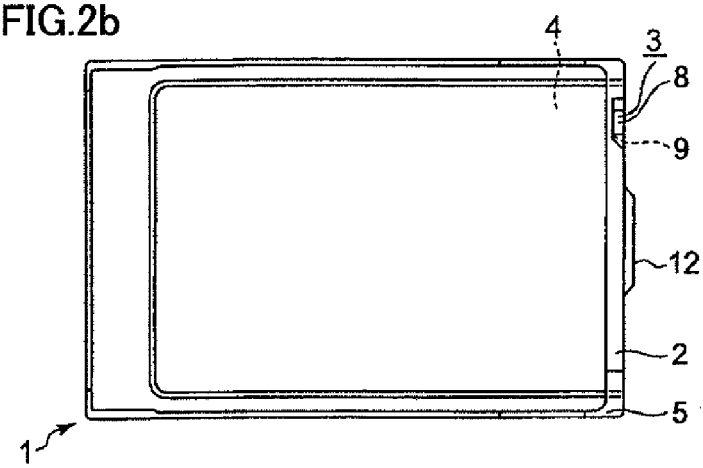
FIG. 2b is an appearance diagram illustrating a top view of the card-type device according to an exemplary embodiment.
Figure 2C:
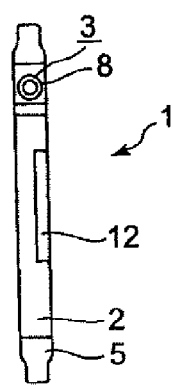
FIG. 2c is an appearance diagram illustrating a side view showing the slide antenna board of the card-type device according to an exemplary embodiment.
Figure 2D:
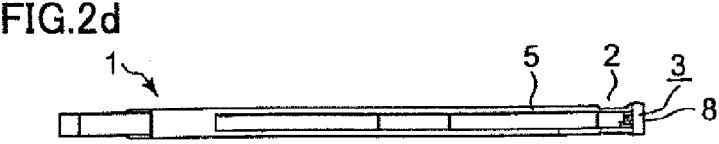
FIG. 2d is an appearance diagram illustrating a side view of the card-type device according to an exemplary embodiment.
Figure 2E:
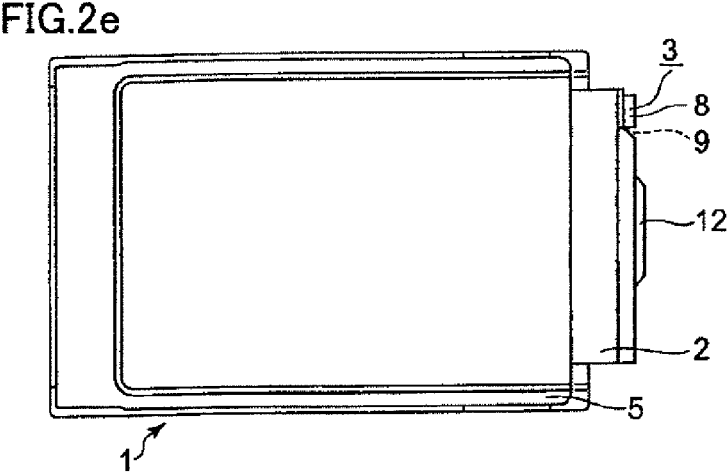
FIG. 2e is an appearance diagram illustrating a top view of a card-type device according to an exemplary embodiment in a state in which the slide antenna board is pulled out.

FIG. 1a illustrates the state in which slide antenna board 2 is accommodated in the card body 5. FIG. 1b illustrates the state in which slide antenna board 2 is pulled out from the card body 5. FIGS. 2a, 2b and 2c illustrate the state in which slide antenna board 2 is accommodated in the card body 5. FIGS. 2d and 2e illustrate the state in which slide antenna board 2 is pulled out from the card body 5. FIGS. 2b and 2e are plan views illustrating card-type device 1. FIGS. 2a and 2d are side views illustrating card-type device 1. FIG. 2c is a view illustrating card-type device 1 when viewed from a side on which slide antenna board 2 is provided.

Embodiments consistent with the disclosure include at least one wireless communication antenna. In the exemplary embodiment shown in FIGS. 1a and 1b, a wireless communication planar type antenna 7 includes two wireless communication planar type antennae 7a and 7b, which are provided on a pull-out leading end side of slide antenna board 2. The exemplary embodiment also includes a communication rod antenna 3. A base end side of a wireless communication rod antenna 3 is fixed to card body 5. A slide guide 4 of a through-hole is provided in slide antenna board 2, and an extended side of wireless communications rod antenna 3 from the base end side is slidably and stretchably provided in a slide direction of slide antenna board 2 through slide guide 4.

Figure 3:
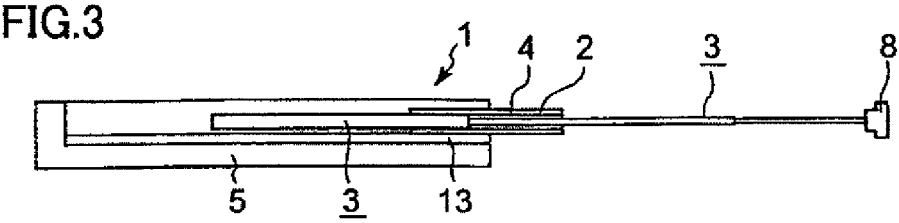
FIG. 3 is a schematic sectional view illustrating a stretching configuration of the rod antenna in the card-type device according to an exemplary embodiment.
Figure 4:
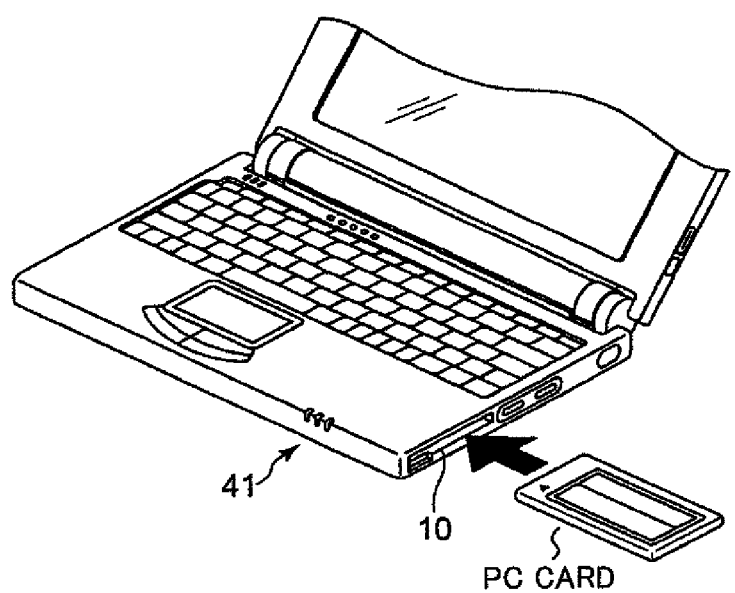
FIG. 4 is an explanatory view illustrating an operation to insert a PC card in a personal computer.

As illustrated in FIG. 3, wireless communication rod antenna 3 can include a multi-stage rod unit, which is a three-stage unit in this exemplary embodiment, so as to be freely stretchable. Therefore, as described above, rod antenna 3 is slidable and stretchable in the slide direction of slide antenna board 2. In rod antenna 3, when an antenna head 8 of the rod antenna 3 is pulled out forward, for example, by holding antenna head 8 between two fingers, antenna head 8 is extended to project a leading end side of antenna head 8 ahead of a leading end surface of slide antenna board 2. Conversely, when antenna head 8 of rod antenna 3 is pressed onto the side of slide antenna board 2, rod antenna 3 contracts to return to an original position. In FIG. 3, the numeral 13 designates a lower board provided in card body 5. With the slide antenna board slidingly engaged with the lower board 13, a micro gap is interposed between lower board 13 and slide antenna board 2, and lower board 13 electrically connects to rod antenna 3 and planar type antenna 7.

Figure 1C:
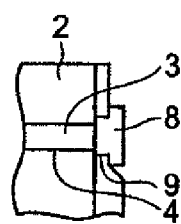

Antenna head 8 located on the leading end side of rod antenna 3 constitutes a large diameter region that overhangs outside of other regions. As illustrated in FIG. 1c, the large diameter region (i.e., antenna head 8) engages with a head fitting unit 9 provided on the leading end side of slide guide 4 of slide antenna board 2. Head fitting unit 9 is formed into a recess shape so as to act as an engaged unit of antenna head 8. Head fitting unit 9 is formed such that a diameter of antenna head 8 is larger than an inner diameter of slide guide 4, to thereby constitute an engagement portion that engages with the head fitting unit 9 of slide antenna board 2. Therefore, when slide antenna board 2 is pulled out from card body 5, rod antenna 3 is configured to be pulled out together with slide antenna board 2.

In the exemplary embodiment, an antenna leading end surface (i.e., the end portion of antenna head 8) of rod antenna 3 in the accommodation state is provided in a retreat position in which the antenna leading end surface is not projected ahead of the leading end surface of slide antenna board 2. Therefore, rod antenna 3 has the following configuration. For example, as illustrated in FIG. 1a, card body 5 is inserted in card slot 10 while slide antenna board 2 is accommodated in card body 5. At this point, slide antenna board 2 and rod antenna 3 are not projected outward from card slot 10, but are inserted in card slot 10 together with card body 5.

In the exemplary embodiment, a projection 12 projecting ahead, or outward is provided on the pull-out leading end side of slide antenna board 2. As illustrated in FIG. 1a, projection 12 is projected from card slot 10 while slide antenna board 2 is accommodated in card body 5 to insert card body 5 in card slot 10. Therefore, projection 12 constitutes a grasp unit when slide antenna board 2 is pulled out from card body 5 of slide antenna board 2. In the exemplary embodiment, projection 12 is a grasp unit than can be grasped to pull out slide antenna board 2 from card body 5, as illustrated in FIG. 1b, which allows the leading end side of rod antenna 3 to be easily pulled out from card slot 10 together with slide antenna board 2.

Follow-up engagement assembly is provided in the exemplary embodiment. The follow-up engagement assembly follows up slide antenna board 2 to slidably contract rod antenna 3 and accommodate rod antenna 3 in card body 5, when slide antenna board 2 pulled out from card body 5 is inserted and accommodated in card body 5. The follow-up engagement assembly is provided on the leading end side of rod antenna 3.

As illustrated in FIG. 1b, the follow-up engagement assembly functions while the leading end surface (i.e., the end face of antenna head 8) of rod antenna 3 is retreated to the retreat position in which the leading end surface of rod antenna 3 is not projected ahead of the leading end surface of slide antenna board 2. At this point, slide antenna board 2 is slidably moved onto a side opposite to the pull-out direction to insert and accommodate slide antenna board 2 in card body 5, and the follow-up engagement assembly causes rod antenna 3 to follow up slide antenna board 2 to slidably contract rod antenna 3.

In the embodiment, the follow-up engagement assembly is one in which antenna head 8 of rod antenna 3 is formed slightly larger than head fitting unit 9 (however, a size in which antenna head 8 can be press-fitted in head fitting unit 9). Therefore, as illustrated in FIG. 1c, antenna head 8 of rod antenna 3 and an inner wall of head fitting unit 9 of slide antenna board 2 are configured such that friction becomes larger therebetween. Antenna head 8 is configured to hardly come off from head fitting unit 9. The surface on an outer circumferential side of antenna head 8 can be roughly formed to further increase the friction with the inner wall of head fitting unit 9. FIG. 1c is an enlarged view illustrating a fitting configuration between head fitting unit 9 and antenna head 8 of rod antenna 3 in the state of FIG. 1a.

At this point, slide antenna board 2 is slidably moved toward the side of card body 5 while antenna head 8 of rod antenna 3 is press-fitted such that the leading end surface of antenna head 8 is not projected from the leading end surface of slide antenna board 2. Therefore, both slide antenna board 2 and rod antenna 3 are accommodated in card body 5 such that the side of antenna head 8 of rod antenna 3 is not left extending from the card body. That is, when slide antenna board 2 is accommodated in card body 5, both slide antenna board 2 and rod antenna 3 are accommodated in card body 5 while the leading end side of rod antenna 3 is not projected. The follow-up engagement assembly is not limited to the configuration of the exemplary embodiment. For example, the follow-up engagement assembly may be formed by providing, in rod antenna 3, a pawl unit or the like, which detachably engages with the engaged unit provided in slide antenna board 2 when antenna head 8 of rod antenna 3 is accommodated in slide antenna board 2.

The invention is not limited to the embodiment, but various embodiments can be made in the invention. For example, in the embodiment, two planar type antennae 7 are provided in slide antenna board 2. Alternatively, one or at least three planar type antennae 7 may be provided in slide antenna board 2.

In the embodiment, antenna head 8 of rod antenna 3 is formed larger than other regions so as to constitute the engagement (engaged) unit for slide antenna board 2. There is no particular restriction to an aspect of the engagement unit, but the aspect of the engagement unit is set as appropriate. For example, the engaged unit is provided in slide antenna board 2, and a projection or a pawl unit for engaging with the engaged portion may be provided on the side of rod antenna 3 so as to constitute the engagement unit.

In the exemplary embodiment, projection 12 is provided as the pull-out configuration for pulling out slide antenna board 2 from card body 5. However, an embodiment can exclude a projection 12. In such cases, for example, a spring that presses antenna board 2 in a direction in which antenna board 2 is projected (jumped out) from card body 5 may be provided in a connection unit between card body 5 and slide antenna board 2, and a latch configuration in which antenna board 2 is latched in card body 5 provided in the configuration in which the spring is provided. The latch configuration can be one in which slide antenna board 2 can be accommodated in card body 5 against an elastic force of the spring when slide antenna board 2 is accommodated in card body 5. When an end face of slide antenna board 2 accommodated in card body 5 is pressed onto the side of card body 5, the latch configuration comes off, and slide antenna board 2 jumps out from card body 5 by the elastic force of the spring.

In the exemplary embodiment, slide guide 4 includes the through-hole. Alternatively, slide guide 4 may include a guide groove that guides rod antenna 3. Alternatively, slide guide 4 may include guide walls that are provided with a gap such that rod antenna 3 is sandwiched therebetween.

The card-type device described herein can be implemented in a variety of applications. For example, it can be applied in a card-type device, such as the PC card and the CF card, which is inserted in the personal computer.

An embodiment of a card-type device according to the disclosure can include a card body being inserted in the card insertion unit, and the slide antenna board can be accommodated on the insertion rear end side of the card body. At least one planar type antenna is provided in the slide antenna board. The base end side of the rod antenna is fixed to the card body, and an extended side of the rod antenna is slidably and stretchably disposed in the slide direction of the slide antenna board through the slide guide provided in the slide antenna board. That is, the card-type device of the invention can facilitate including a plurality of types of antennae including the planar type antenna and the rod antenna. Accordingly, the card-type device of the invention can implement the recently-demanded card-type device including the plurality of types of antennae.

In a card-type device according to the disclosure, in the state in which the rod antenna is accommodated, the antenna leading end surface of the rod antenna can be provided in the retreat position in which the antenna leading end surface is not projected ahead of the leading end surface of the slide antenna board. Accordingly, the card body is inserted in the card insertion unit while the slide antenna board is accommodated in the card body, whereby the slide antenna board and the rod antenna are inserted in the card insertion unit while not projected outward from the card insertion unit. Therefore, the shock from the outside can be avoided to improve the shatter resistance. Additionally, the improvements of the portability and operability can be achieved in the card-type device of the invention. In the card-type device of the invention, the good appearance can also be retained in inserting the card-type device in the card insertion unit of the personal computer or the like.

In the card-type device according to an embodiment, the engagement unit for engaging with the slide antenna board is provided on the leading end side of the rod antenna. The rod antenna can be pulled out together with the slide antenna board when the slide antenna board is pulled out from the card body. Accordingly, the slide antenna board and the rod antenna can simultaneously be pulled out to improve usability.

In an exemplary embodiment, a projection projected ahead can be provided on a pull-out leading end side of the slide antenna board. The projection can be projected from the card insertion unit when the card body is inserted in the card insertion unit while the slide antenna board is accommodated in the card body. Therefore, the slide antenna board can easily be pulled out by grasping the projection, even if the card body is inserted in the card insertion unit while the slide antenna board is accommodated in the card body.

In an exemplary embodiment, follow-up engagement assembly can be provided on the leading end side of the rod antenna. The follow-up engagement assembly can be configured to cause the rod antenna to follow up the slide antenna board to slidably contract the rod antenna and accommodates the rod antenna in the card body, when the slide antenna board is inserted and contracted. The slide antenna board can be accommodated while the leading end surface of the pulled-out rod antenna is retreated to a retreat position in which the leading end surface of the pulled-out rod antenna is not projected ahead of the leading end surface of the slide antenna board. At this point, the slide antenna board in a state of being pulled out from the card body can be slidably moved on a side opposite a pull-out direction of the slide antenna board to be inserted and accommodated in the card body. When a follow-up engagement assembly is provided, even in accommodating the slide antenna board, the rod antenna can be accommodated by following up the slide antenna board. Therefore, usability can be improved.

It should be understood that the above-described embodiments are illustrative only and that variations and modifications will be apparent to those skilled in the art without departing from the scope and spirit of the disclosure. The scope of the present invention should be determined in view of the appended claims and their equivalents.

The invention claimed is:

1. A card-type device comprising:
   a card body; and
   a slide antenna board,
   wherein the slide antenna board is slidably provided in the card body and slidably movable in a slide direction between a state in which slide antenna board is accommodated on an insertion rear end side of the card body and a state in which the slide antenna board is pulled out from said card body,
   the antenna board includes at least one planar type antenna;
   a base end side of a rod antenna is fixed to said card body;
   an extended side of the rod antenna from the base end side is slidably and stretchably disposed in the slide direction through a slide guide in said slide antenna board,
   an engagement unit configured to engage with said slide antenna board is provided on a leading end side of said rod antenna such that the rod antenna is pulled out together with said slide antenna board when the slide antenna board is pulled out from the card body,
   in the state in which said rod antenna is accommodated, an antenna leading end surface of the rod antenna is provided in a retreat position in which the antenna leading end surface is not projected ahead of a leading end surface of the slide antenna board,
   the card body is configured to be insertable in a card insertion unit while the slide antenna board is accommodated in the card body, thereby the slide antenna board and the rod antenna are insertable in the card insertion unit while not projected outward from the card insertion unit, and
   the leading end side of said rod antenna is configured to be pulled out from the card insertion unit together with the slide antenna board while the slide antenna board is pulled out from the card body.

2. The card-type device according to claim 1, wherein a pull-out leading end side of the slide antenna board includes a projection projected ahead of the pull-out leading end side, and
   the projection is configured to project from the card insertion unit while the card body is inserted in the card insertion unit and while said slide antenna board is accommodated in the card body, thereby constituting a grasp unit in pulling out said slide antenna board from said card body.

3. The card-type device according to claim 1, wherein the leading end side of the rod antenna includes a follow-up engagement assembly, the follow-up engagement assembly configured to cause the rod antenna to follow up the slide antenna board to slidably contract the rod antenna and accommodate the rod antenna in the card body, when the slide antenna board pulled out from card body is slidably moved on a side opposite to a pull-out direction of the slide antenna board pulled out from the card body to insert and accommodate the slide antenna board in said card body while the leading end surface of the pulled-out rod antenna is retreated to the retreat position in which the leading end surface of the pulled-out rod antenna is not projected ahead of the leading end surface of the slide antenna board.

4. The card-type device according to claim 2, wherein the leading end side of the rod antenna includes a follow-up engagement assembly, the follow-up engagement assembly configured to cause the rod antenna to follow up the slide antenna board to slidably contract the rod antenna and accommodate the rod antenna in the card body, when the slide antenna board pulled out from card body is slidably moved on a side opposite to a pull-out direction of the slide antenna board pulled out from the card body to insert and accommodate the slide antenna board in said card body while the leading end surface of the pulled-out rod antenna is retreated to the retreat position in which the leading end surface of the pulled-out rod antenna is not projected ahead of the leading end surface of the slide antenna board.

* * * * *